2,778,851

PREPARATION OF α-CHLORO-α-METHYL ALIPHATIC ACIDS AND ACID-CHLORIDES

Donald G. Kundiger, Joe G. Peterson, and Ernest A. Ikenberry, Manhattan, Kans., assignors to The Dow Chemical Company, Midland, Mich., a corporation of Delaware No Drawing. Application September 3, 1953, Serial No. 378,404

14 Claims. (Cl. 260—539)

This invention is concerned with the preparation of α-chloro-α-methyl aliphatic acid-chlorides and the corresponding acids and is particularly directed to the method of preparing such compounds by contacting a 1,1,1-trichloro-2-methyl-2-alkanol with concentrated sulfuric acid.

According to the present invention it has been discovered that 1,1,1-thrichloro-2-methyl-2-alkanols, having the formula

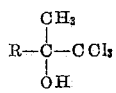

wherein R represents a straight-chain lower alkyl radical containing from 1 to 6 carbon atoms, inclusive, when contacted with concentrated sulfuric acid at a temperature of 10° to 75° C., react to produce at least one member of the group having the formula

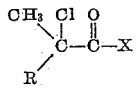

wherein R has the previously mentioned significance and X represents chlorine or a hydroxyl radical.

The expression "concentrated sulfuric acid" is employed herein mean sulfuric acid of 90 to 106 percent concentration by weight, wherein concentrations of greater than 100 percent indicate that the sulfuric acid contains in solution sulfur trioxide equivalent to the indicated excess of sulfuric acid over 100 percent and where water constitutes the other ingredient in the acid of concentration less than 100 percent.

In carrying out the invention one molecular proportion of a 1,1,1-trichloro-2-methyl-2-alkanol, as set forth above, is mixed with at least one molecular proportion of concentrated sulfuric acid and maintained at a temperature of from about 10° to 75° C. for a period of time. The reaction proceeds with the evolution of hydrogen chloride gas. Upon completion of the reaction, the desired product is separated by conventional procedures such as layer separation, extraction, and fractional distillation.

When it is desired that the α-chloro-α-methyl aliphatic acid-chloride be a principal product, the reaction is carried out at temperatures of from 10° to 60° C. and 97 to 106 percent sulfuric acid is employed. In such operations the evolution of hydrogen chloride gas is extremely vigorous and care is required to avoid excessive rates of reaction resulting in undesired foaming and loss of product. Upon completion of the reaction, the reaction mixture separates into a layer which comprises the major portion of the sulfuric acid and a second layer which consists predominantly of the desired acid-chloride product. The latter is separated as rapidly as possible in order to avoid undesired side reactions leading to loss of product. The resulting crude α-chloro-α-methyl aliphatic acid-chloride may then be further purified, if desired, by fractional distillation under reduced pressure.

When completely anhydrous starting materials are employed in the above procedure, the reaction is particularly violent and difficult to control and the desired separation of layers may not be obtained. It is, therefore, generally advantageous to use substituted alkanol starting materials containing from about 0.5 to 5.0 percent by weight of water. For example, in producing α-chloroisobutyryl chloride as a principal product, it is preferred to employ 105 percent sulfuric acid with 1,1,1-trichloro-2-methyl-2-propanol containing from about 0.5 to 2 percent of water.

In the above operations any water present in the system reacts to form an equivalent proportion of α-chloro-α-methyl aliphatic acid from the corresponding acid-chloride. After separation of the acid-chloride layer as described above, the sulfuric acid layer which remains is saturated with respect to the α-chloro-α-methyl aliphatic acid-chloride and further contains any of the corresponding acid formed by reaction with water in the system. These latter products are recovered in the form of the α-chloro-α-methyl aliphatic acid by diluting the acid layer with water as will be hereinafter described.

When it is desired to obtain the α-chloro-α-methyl aliphatic acid as the principal product, the reaction is carried out with sufficient water present as a constituent of the starting materials to prevent the separation of an acid-chloride layer. In such operations, substituted alkanols containing about 2 to 5 percent of water and 90 to 97 percent sulfuric acid solutions are preferably employed. The preferred temperature for the reaction increases as the concentration of sulfuric acid decreases. Thus, for example, for 95 percent sulfuric acid it is desirable to operate at from 20° to 70° C. and with 90 percent sulfuric acid at from 45° to 75° C. Upon completion of the reaction, the product is separated by cooling the reaction mixture, diluting with water or ice and recovering the desired acid product as by extraction with a water-immiscible solvent such as benzene or ether. From the resulting extract, the acid product may then be separated by fractional distillation or crystallization.

While the reaction is operable over the temperature ranges and with the concentrations of sulfuric acid as set forth above, it has been found desirable by reason of improved yields to carry out the process at temperatures of from 10° to 40° C. and with 95 percent to 106 percent sulfuric acid and the reaction under these conditions constitutes a preferred embodiment of the invention.

It is sometimes desirable to carry out the reaction in the presence of an inert liquid solvent which is relatively insoluble in sulfuric acid at the reaction temperature. Suitable inert solvents include saturated hydrocarbon distillates derived from petroleum, aromatic solvents such as benzene, toluene and chlorobenzene and chlorinated solvents such as carbon tetrachloride, methylene chloride and the like. Small proportions of inert solvent serve to control the foaming characteristic of the vigorous evolution of HCl in the early stages of the reaction while larger proportions of solvent may be employed advantageously to facilitate the separation of the desired product upon completion of the reaction.

The order of addition of reagents is sometimes critical. For example, if it is desired to separate the acid-chloride as a product of the reaction, the concentrated sulfuric acid is added portionwise with stirring to the substituted alkanol. On the other hand, when the α-chloro-α-methyl aliphatic acid is the sole desired product, the order of addition of reagents is unimportant and may be chosen according to the convenience of the operator.

The reaction is exothermic and usually requires cooling means to avoid overheating, particularly when operating with reactants of very low water-content as set forth above for the production of the acid-chloride product. On the other hand, when employing reactants containing appreciable amounts of water, as for example, when reacting a partially hydrated, substituted alkanol with 90 percent sulfuric acid, it is usually necessary to provide external heating means in order to maintain the reaction temperature in the desired range. In any case, the temperature and rate of the reaction can be controlled to a considerable degree by the rate of admixture of the reactants.

The course of the reaction may be further controlled by the proportions of reactants employed. The achievement of appreciable yields of the desired products requires the use of at least one molecular proportion of concentrated sulfuric acid for each molecular proportion of 1,1,1-trichloro-2-methyl-2-alkanol, as set forth above. Furthermore, it has been found that the separation of an acid-chloride layer is dependent on employing from about 1 to 2 and preferably from about 1.5 to 1.8 moles of 100 percent sulfuric acid per mole of substituted alkanol in the reaction. When the separation of the product in the form of the acid-chloride is not desired and the product is to be isolated in the acid form, higher proportions of concentrated sulfuric acid to substituted alkanol may be employed.

The design of equipment for carrying out the reaction is not critical provided that adequate means are employed for controlling the temperature by the addition or removal of heat as set forth above. The materials used in the construction of the reactor should be resistant to corrosion by the acids employed in and produced by the reaction and means for venting or recovering the hydrogen chloride gas produced as a by-product are preferably provided.

The following examples illustrate the invention but are not to be construed as limiting the same:

Example 1

One liter of concentrated sulfuric acid (95.5 percent $H_2SO_4$, specific gravity 1.84 at 60° F.) was placed in a reactor and 933 grams (5 moles) of powdered 1,1,1-trichloro-2-methyl-2-propanol added thereto with stirring over a period of 25 minutes. The 1,1,1-trichloro-2-methyl-2-propanol employed was partially hydrated and contained about one-half mole of water per mole of propanol compound. Reaction, as evidenced by the evolution of hydrogen chloride, was initiated rapidly, accompanied by heating, when the reactants were admixed. The rate of addition of the trichloromethylpropanol was controlled so as to maintain the reaction mixture at a temperature of from about 35° to about 45° C. Upon completion of the reaction the dark red reaction mixture was poured over 2.5 kilograms of crushed ice, the resulting mixture separating into an aqueous layer and an organic layer. The latter was separated and the aqueous layer extracted three times with 100 milliliter portions of ether. The ether extracts and the previously separated organic layer were combined, neutralized with sodium carbonate and the neutralized mixture extracted with water to obtain an aqueous solution of the sodium salts of the acidic products of reaction. The latter solution was washed twice with 50 milliliter portions of ether, and made strongly acid with concentrated hydrochloric acid, the resulting mixture separating into an aqueous layer and an organic layer. The latter was separated and the aqueous layer extracted three times with 50 milliliter portions of ether. The separated organic layer and the ether extracts were combined, dried over anhydrous magnesium sulfate and fractionally distilled to obtain an α-chloroisobutyric acid product boiling at 93°–95° C. under 20 millimeters pressure. This product was obtained in the yield of 512.5 grams or 83.6 percent of theory.

Example 2

372 grams (2 moles) of the hemihydrate of 1,1,1-trichloro-2-methyl-2-propanol was crushed and placed in a reaction vessel equipped with a water-cooled jacket and a mechanical stirrer. To the above, 174 milliliters (3.26 moles) of 100 percent sulfuric acid was added dropwise with stirring at room temperature. Reaction was initiated rapidly upon admixing of the reactants and a vigorous evolution of hydrogen chloride occurred. About 10 drops of a low-boiling petroleum distillate was added dropwise to the reaction mixture as needed to control foaming. The rate of addition of the sulfuric acid and the temperature of the cooling water in the jacket were adjusted so as to maintain the reaction temperature in the range of 20° to 33° C. Upon completion of the addition of sulfuric acid the evolution of hydrogen chloride became very vigorous, then gradually subsided and the reaction mixture separated into a dark red sulfuric acid layer and a pale yellow acid-chloride layer. The latter was separated quickly to obtain 160 milliliters of crude α-chloroisobutyryl chloride. In addition, 60 grams of α-chloroisobutyric acid was obtained by pouring the dark red sulfuric acid layer onto 1000 grams of crushed ice, said α-chloroisobutyric acid being recovered by separating the crude crystalline product from the ice-acid mixture.

Example 3

558 grams (3 moles) of the hemihydrate of 1,1,1-trichloro-2-methyl-2-propanol was reacted with 263 milliliters (4.9 moles) of 100 percent sulfuric acid, employing the reaction vessel and method of reaction described in Example 2. Upon completion of the reaction the acid-chloride layer was separated and fractionally distilled under vacuum to obtain an α-chloroisobutyryl chloride product boiling at 53°–61° C. under 98 to 100 millimeters pressure. The latter was obtained in a yield of 181.6 grams or 43 percent of theoretical. The sulfuric acid layer from the reaction was worked up by pouring into ice, extracting and fractionally distilling to obtain, in addition to the above, an α-chloroisobutyric acid product boiling at 84°–90° C. under 20 millimeters pressure and amounting to 124 grams or 33.7 percent of theory based on the amount of 1,1,1-trichloro-2-methyl-2-propanol employed as a starting material.

Example 4

Following the procedure of Example 2 one mole of 1,1,1-trichloro-2-methyl-2-butanol is reacted with 1.7 moles of 100 percent sulfuric acid. Upon completion of the reaction the acid-chloride layer is separated to obtain an α-chloro-α-methyl n-butyryl chloride product as a mobile liquid.

Example 5

18.6 grams of 90 percent sulfuric acid, containing 16.74 grams (0.17 mole) of sulfuric acid, was placed in a reaction vessel and 9.3 grams (0.05 mole) of finely powdered hemihydrate of 1,1,1-trichloro-2-methyl-2-propanol added thereto portionwise with stirring at room temperature. No evidences of reaction were observed during a period of 10 minutes at 26° C. and the reaction mixture was thereafter heated for a period of about 15 minutes at temperatures of from 45° to 70° C. Vigorous reaction as evidenced by the evolution of hydrogen chloride gas ensued. Upon completion of the reaction, the reaction mixture was cooled and poured over 50 grams of finely crushed ice. Heat was evolved and the mixture separated into an aqueous phase and an organic phase which was liquid at temperatures above 32° C. The mixture was extracted successively with two 10-milliliter portions and one 20-milliliter portion of benzene. The benzene extracts were combined and fractionally distilled to obtain as a residue an α-chloroisobutyric acid product as a white crystalline compound freezing at 31° to 32° C.

This product was obtained in the yield of 62 percent of theoretical.

In similar fashion, 1,1,1-trichloro-2-methyl-2-pentanol, 1,1,1-trichloro-2-methyl-2-hexanol and 1,1,1-trichloro-2-methyl-2-octanol are reacted with sulfuric acid to produce α-chloro-α-methylvaleric acid, α-chloro-α-methylcaproic acid and α-chloro-α-methylcaprylic acid, respectively, and the corresponding acid-chlorides.

In one preferred embodiment of the invention the preparation of the acid-chloride products is carried out on a continuous or semi-continous basis. In such operations, the substituted alkanol and sulfuric acid of 100 to 106 percent concentration are continuously metered in the proper proportions, as set forth above, into a reaction zone maintained at a temperature in the reaction range. The rate of passage of the mixture through the reaction zone is regulated to maintain the reactants in contact for a sufficient time to complete the reaction as described above. Portions of the reaction mixture are continuously withdrawn and passed into a settler or separator, acid-chloride drawn off for storage or for further purification and the sulfuric acid layer recycled with additional substituted alkanol and fresh acid as required to produce further quantities of acid-chloride. From time to time portions of spent sulfuric acid are drawn off and admixed with a quantity of cold water or ice to recover the α-chloro-α-methyl aliphatic acid contained therein.

The 1,1,1-trichloro-2-methyl-2-alkanols employed in the reaction may be prepared by reacting a ketone of the formula $$R-\underset{\underset{O}{\|}}{C}-CH_3$$

wherein R is a straight chain alkyl radical having from 1 to 6 carbon atoms, inclusive, with chloroform in the presence of a finely powdered strong base such as potassium hydroxide. These substituted alkanol materials are preferably employed in the reaction with a minimum water content of the order of 0.5 percent by weight, particularly when employing as the other reactant sulfuric acid of the concentration of 100 percent or greater.

We claim:

1. A method for the production of at least one member of the group consisting of α-chloro-α-methyl aliphatic acids and acid-chlorides, having the formula

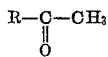

wherein R represents a straight chain lower alkyl radical containing from 1 to 6 carbon atoms, inclusive, and X represents a member of the group consisting of chlorine and hydroxyl, which comprises reacting a 1,1,1-trichloro-2-methyl-2-alkanol of the formula

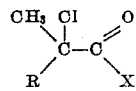

wherein R has the above significance, with sulfuric acid, the reaction being carried out at 10°–75° C. and employing sulfuric acid of 90 to 106 percent concentration.

2. A method according to claim 1, wherein the sulfuric acid is employed in the proportion of from 1 to about 2 moles per mole of 1,1,1-trichloro-2-methyl-2-alkanol in the reaction.

3. A method according to claim 1, wherein the temperature of reaction is between 10° and 40° C. and the concentration of sulfuric acid is from 95 to 106 percent.

4. A method according to claim 1, wherein the trichloromethylalkanol contains from about 0.5 to 5.0 percent by weight of water.

5. A method for the production of an α-chloro-α-methyl aliphatic acid-chloride which comprises reacting a 1,1,1-trichloro-2-methyl-2-alkanol of the formula

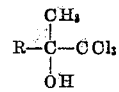

wherein R represents a straight chain alkyl radical containing from 1 to 6 carbon atoms, inclusive, with sulfuric acid of 97 to 106 percent concentration at a temperature of from about 10° to about 30° C.

6. A method according to claim 5 in which the sulfuric acid is employed in the amount of from 1 to about 2 moles per mole of said alkanol in the reaction.

7. A method according to claim 5, in which the sulfuric acid is added to the alkanol portionwise and with agitation.

8. A method for the preparation of an α-chloro-α-methyl aliphatic acid-chloride which comprises reacting one molecular proportion of a 1,1,1-trichloro-2-methyl-2-alkanol of the formula

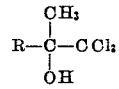

wherein R represents a straight chain alkyl radical containing from 1 to 6 carbon atoms, inclusive, with from one to two molecular proportions of sulfuric acid of 97 to 106 percent concentration at a temperature of from about 10° to about 30° C. and thereafter rapidly separating the acid-chloride layer from the crude reaction mixture.

9. A method for the production of an α-chloro-α-methyl aliphatic acid which comprises reacting a 1,1,1-trichloro-2-methyl-2-alkanol of the formula

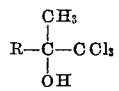

wherein R represents a straight chain alkyl radical containing from 1 to 6 carbon atoms, inclusive, with sulfuric acid of 90 to 97 percent concentration at a temperature of from about 20° to 75° C.

10. A method according to claim 9 in which the sulfuric acid is employed in the amount of at least one mole per mole of said alkanol in the reaction.

11. A method for the preparation of an α-chloro-α-methyl aliphatic acid which comprises reacting one molecular proportion of a 1,1,1-trichloro-2-methyl-2-alkanol of the formula

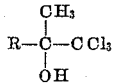

wherein R represents a straight chain alkyl radical containing from 1 to 6 carbon atoms, inclusive, with at least one molecular proportion of sulfuric acid of 90 to 97 percent concentration at a temperature of from about 20° to 75° C. and thereafter introducing into the reaction mixture sufficient water to facilitate the separation of said aliphatic acid.

12. A method for the production of at least one member of the group consisting of α-chloro-α-methyl aliphatic acids and acid-chlorides, having the formula

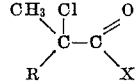

wherein R represents a straight chain lower alkyl radical containing from 1 to 6 carbon atoms, inclusive, and X represents a member of the group consisting of chlorine and hydroxyl radical, which comprises reacting a 1,1,1-trichloro-2-methyl-2-alkanol of the formula

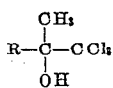

wherein R has the above significance, with sulfuric acid, the reaction being carried out at 10°–75° C. and employing sulfuric acid of 90 to 106 percent concentration, said reaction being carried out in the presence of a liquid reaction solvent selected from the group consisting of hydrocarbon and chlorohydrocarbon aromatic and saturated aliphatic compounds.

13. A method for the production of α-chloro-isobutyryl-chloride which comprises reacting 1,1,1-trichloro-2-methyl-2-propanol, containing from about 0.5 to 2 percent of water, with sulfuric acid of 105 percent concentration at a temperature of from about 10° to about 30° C.

14. A method according to claim 13 wherein the sulfuric acid is employed in the amount of from 1.5 to 1.8 moles per mole of the substituted propanol in the reaction.

References Cited in the file of this patent

UNITED STATES PATENTS

| | | |
|---|---|---|
| 2,036,137 | Guyot | Mar. 31, 1936 |
| 2,226,645 | Thomas et al. | Dec. 31, 1940 |

FOREIGN PATENTS

| | | |
|---|---|---|
| 362,748 | Germany | Oct. 31, 1922 |